United States Patent [19]

Kurata

[11] 4,047,278
[45] Sept. 13, 1977

[54] METHOD OF MANUFACTURING HAMMER

[76] Inventor: Yoshio Kurata, 2-17, Joto 5-chome, Kofu, Yamanashi, Japan

[21] Appl. No.: 739,488

[22] Filed: Nov. 8, 1976

[30] Foreign Application Priority Data

Apr. 20, 1976 United Kingdom ............... 15914/76

[51] Int. Cl.² ............................................ B23P 17/00
[52] U.S. Cl. ..................................... 29/424; 29/436; 29/460; 72/465; 72/705; 76/103; 145/29 B; 264/242; 264/263
[58] Field of Search ................. 29/418, 424, 423, 460, 29/434, 436; 72/705, 465; 76/103; 264/263, 328, 271, 242, 279; 145/29 B

[56] References Cited

U.S. PATENT DOCUMENTS

| | | | |
|---|---|---|---|
| 6,623 | 8/1875 | Parker | 76/103 UX |
| 2,198,764 | 4/1940 | Edwards | 72/479 X |
| 2,906,150 | 9/1959 | Stewart | 72/465 |
| 2,934,815 | 5/1960 | Stumbock | 29/418 X |
| 2,991,548 | 7/1961 | Henry | 29/424 |
| 3,000,414 | 9/1961 | Cordis | 145/29 B |
| 3,089,232 | 5/1963 | Knight | 264/242 X |
| 3,148,716 | 9/1964 | Vaughan | 145/29 B |
| 3,214,504 | 10/1965 | Gemberling | 264/242 |
| 3,961,519 | 6/1976 | Kurata | 72/705 |
| 3,998,922 | 12/1976 | Weiss | 264/263 X |

FOREIGN PATENT DOCUMENTS

| | | | |
|---|---|---|---|
| 733,391 | 7/1955 | United Kingdom | 145/29 C |

*Primary Examiner*—Charlie T. Moon

*Attorney, Agent, or Firm*—George B. Oujevolk

[57] ABSTRACT

In manufacturing a hammer for sheet metal work and repair or shaping of metal sheets, the hammer is made with a hammer head and an adapter which has a face for striking the workpiece and is coaxially connected to the hammer head in such a manner that the adapter, upon the striking of the hammer, rotates with respect to the hammer head in a predetermined direction from its "at rest" position, and then automatically returns to its original position. The hammer head and the adapter are, first, provided in the area where they are in contact with other when set in the at rest position with a lubricant, then, they are positioned with respect to each other in a predetermined relationship, and temporally bonded to each other by a temporary bonding agent which is applied over adjoining peripheral portions of the hammer head and the adapter and the liquid then tightly covers the adjoining peripheral portions. Heat melted elastic material is provided over the peripheral portions of the hammer head and the adapter including therebetween the applied bonding agent, so as to form a resilient tubular member which permanently connects the hammer head and the adapter to each other. At the time of forming the resilient member, the temporary bonding agent prevents the elastic material from entering into and also prevents the lubricant from going out of the contact area of the hammer head and the adapter. Upon striking the first blow of the hammer, the temporary bonding action of the bonding agent will be broken.

9 Claims, 7 Drawing Figures

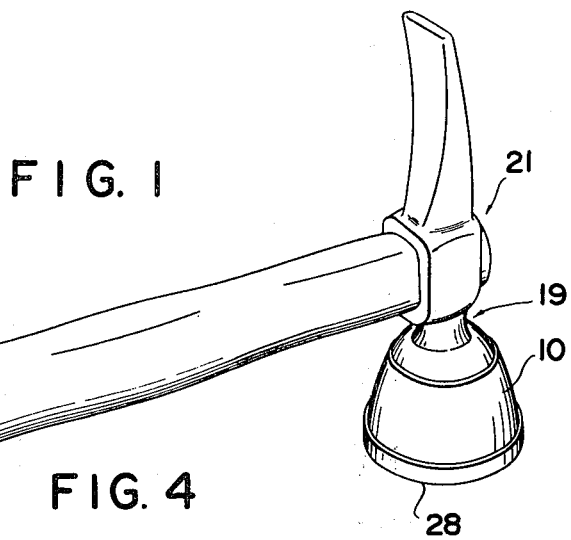
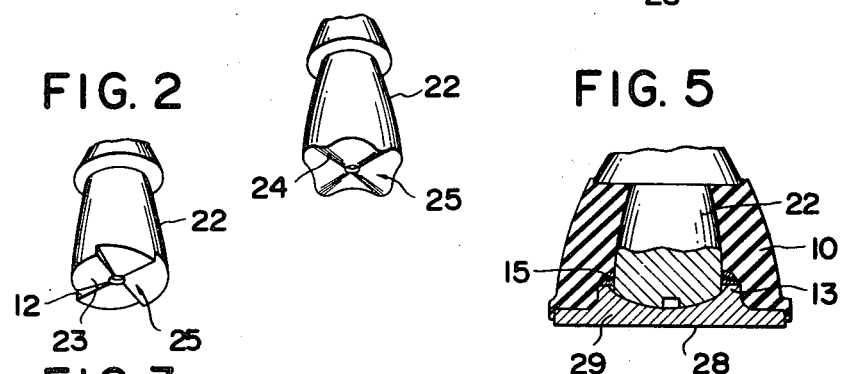
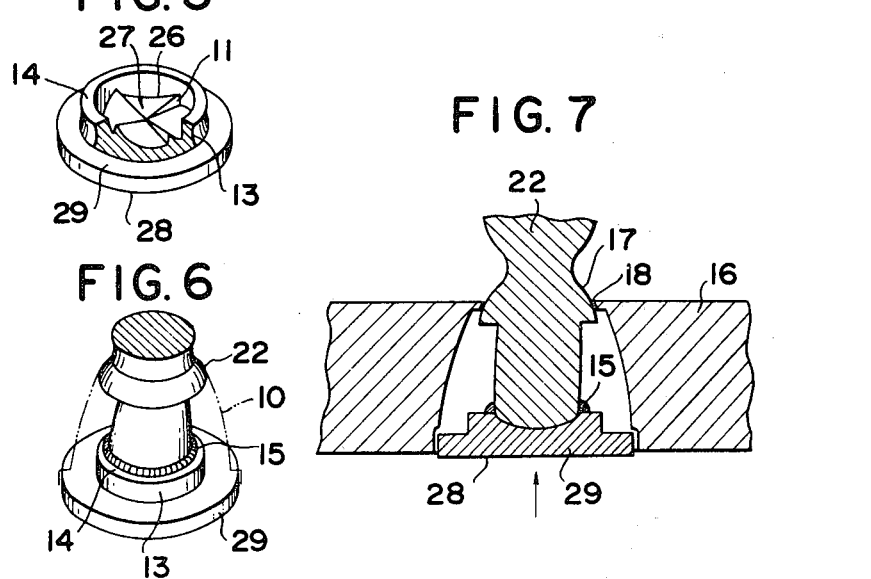

METHOD OF MANUFACTURING HAMMER

Background of the Invention

This invention relates to the manufacture of a hammer, particularly of a hammer having a face for striking a workpiece, which face is to exert a circumferentially sliding rotative force onto the surface of the workpiece.

In sheet or thin plate processing works, it is sometimes important to repair or shape a deformed or depressed portion of a sheet of metal such as iron into a normal or flat shape. Such repair or shaping is ordinarily performed by placing a dolly in abutment against one side of the depressed portion and hitting or striking the depressed portion on its opposite side with a hammer. The struck portion, however, is partially stretched or extended from its original dimension by the striking, and thus protrudes upward to form an undesirable curved shape due to the stretch remaining in the sheet. Consequently, special additional treatment such as heating-and-cooling is required to remove such a stretch to achieve a repaired flat shape.

An improved hammer for the repair and shaping which can eliminate the foregoing problem has been introduced by the inventor of the present invention, and is disclosed in U.S. Pat. No. 3,961,519. It has been confirmed that with this improved hammer a deformation or depression in a metal sheet can be repaired into a normal or flat shape by simply striking with the hammer, and substantially no stretch or extention in the sheet is caused. FIGS. 1 to 5 show an example of the above-mentioned improved hammer, which is generally indicated by the numeral 21 in FIG. 1, as having an elongated hammer head assembly 19 secured at its central portion to an end of a handle. The hammer head assembly 19 has at its one end a hammer head 22 (FIG. 2) which has on its end a head face 25 consisting of a plurality of circumferentially inclined sectorial face sections 23 formed about the central point of the head face 25 at equal angular intervals. The head face 25 may alternatively have a plurality of projections 24, as shown in FIG. 4, formed radially at equal angular intervals, thus providing a plurality of inclined face sections. In abutment with the head face 25 is provided an adapter 29 (FIGS. 3 and 5) which has on its inner side an adapter face 27 consisting of a plurality of inclined face sections 26 which slidably engage respectively with the inclined face sections 23 of the head face 25, and has on the opposite outer side a striking face 28 for striking or hitting a workpiece. The hammer head 22 and the adapter 29 are connected with each other by means of a tubular resilient member 10 (FIGS. 1 and 5) of an elastic material such as rubber which adheringly surrounds both peripheries of the hammer head 22 and the adapter 29. Upon application of a striking impact force onto the striking face 28, the adapter 29, due to the slidable engagement between the adapter face 27 and the head face 25, will rotate, from its predetermined position, in one direction about the central axis of the adapter 29 against the resilient force of the connecting member 10, and upon removal of the impact force, the adapter 29 will automatically return to its original position by the resilient force of the connecting member 10. Thus, upon striking a depressed portion of a metal sheet with the striking face 28 of this hammer 21, with a dolly being placed on the opposite side of the depressed portion, the depressed portion can be repaired into a flat shape without dimensional stretch in the metal, because the rotation of the striking face 28 of the adapter 29 provides a dislocation in the rotational direction of the striking face 28 to the metal structure in and near the depressed portion.

There are, however, some problems in the fabrication of the hammer head assembly 19. First, for sufficient repairing action effected by the rotation of the adapter 29, provision of a lubricant such as grease in the contact area where the head face 25 and the adapter face 27 are in contact with each other is highly desirable in order to minimize the friction between the faces 25 and 27. Such application of lubricant, however, may cause a problem in fabrication of the hammer head assembly 19. Lubricant such as grease which has been applied to the contact area prior to the process of connecting the hammer head 22 and the adapter 29 to each other, which connecting process will then be perfomed by pouring heat-melted elastic material such as rubber into a mold holding therein the hammer head 22 and the adapter 29 to form the tubular resilient member 10, will be heated by the poured heat melted elastic material and a large part of the lubricant will flow out from the contact area to the peripheries of the hammer head 22 and the adapter 29, thus making its difficult for the hammer head 22 and adapter 29 to adhere to the elastic material as well as making the lubrication between the head face 25 and the adapter face 27 insufficient. Further, a part of the melted elastic material will enter the contact area resulting in difficulty in the rotation of the adapter 29 with respect to the hammer head 22 at the time of hammer blow is effected by means of slidable engagement between the inclined face sections 26 of the adapter face 27 and the mating inclined face sections 23 of the head face 25. Accordingly, in order to obtain sufficient rotation of the adapter 29 at the time of the hammer blow, the adapter 29 must be connected to the hammer head 22 through connecting member 10 in a way that the adapter face 27 is so positioned relative to the head face 25 that the adapter 29 can rotate a sufficient degree with respect to the hammer head 22 at the time of hammer blow, i.e., the inclined face sections 26 can move slidingly along the mating inclined face sections 23 a sufficient degree. It is very difficult, however, to properly hold the hammer head 22 and the adapter 29 in the mold for forming the connecting member 10 while maintaining the optimum mutual positioning of the hammer head 22 and the adapter 29, because, at this time, the head face 25 and the adapter face 27 cannot be observed from outside. Forming the connecting member 10 with an erroneous positioning of the hammer head and the adapter will result in a hammer which is ineffective.

SUMMARY OF THE INVENTION

Accordingly, a principal object of the present invention is to provide a method of manufacturing a hammer for the repair and shaping of a metal sheet whereby the foregoing problems in the manufacture of hammer can be eliminated, and thus a hammer of the desired construction described above can be readily provided.

Briefly stated, according to the inventive concept a temporary bonding agent is first applied to the hammer head and the adapter to temporary bond these two parts together in a predetermined positional relationship and then elastic material is used and formed over the temporarily bonded hammer head and adapter to form the resilient connecting member which permanently secures the hammer head and the adapter to each other upon striking the first blow of the hammer the temporary action of the bonding agent is broken.

The foregoing and other objects and advantages will be apparant from the following description of the preferred embodiment which is taken, by way of example, in connection to the accompanying drawings.

BRIEF DESCRIPTION OF THE DRAWINGS

FIG. 1 is a perspective view of a hammer which is produced by the method of the invention;

FIG. 2 is a fragmentary perspective view of the hammer head of the hammer of FIG. 1;

FIG. 3 is a perspective view of the adapter of the hammer of FIG. 1;

FIG. 4 is a fragmentary perspective view of a modification of the hammer head;

FIG. 5 is a fragmentary longitudinal sectional view of the hammer head assembly of the hammer of FIG. 1;

FIG. 6 is a fragmentary perspective view showing the state of the hammer head and the adapter which are temporarily bonded to each other; and FIG. 7 is a fragmentary longitudinal sectional view showing the manner in which the hammer head and the adapter are set in a mold for forming the resilient connecting member.

DETAILED DESCRIPTION OF THE PREFERRED EMBODIMENT

Referring to FIGS. 2 to 4, first, lubircant such as grease of a suitable amount is applied to either or both of the inner head face 25 and the adapter face 27 of the hammer head 22. The hammer head 22 and the adapter 29 are then coaxially positioned with respect to each other in a predetermined relationship so that the adapter 29 will be allowed to rotate a sufficient degree with respect to the hammer head 22 at the time of a hammer blow. The relative position of the head face 25 and the adapter face 27 cannot be observed from the outside because these faces are closely encircled by a sleeve-like wall 13 projecting from the inner side of the adapter 29 to a level higher than that of the adapter face 27. The foregoing predetermined positional relationship between the head face 25 and the adapter face 27, however, can be achieved by fixedly holding the adapter 29, for example, with one vertical face sections 11, which are respectively formed adjacent to the inclined face sections 26, directed in a fixed direction, and setting the hammer head 22 against the adapter 29 so as to bring the head face 25 into contact with the adapter face 27 while maintaining one vertical face section 12 (FIG. 2), which are respectively formed adjacent to the inclined face sections 23, or one of the projections 24 (FIG. 4), in a direction which is so determined that it is spaced by a predetermined angle from the fixed direction of said one vertical face section 11.

Then, with the hammer head 22 and the adapter 29 maintained in the foregoing relationship, bonding agent 15 such as solder is applied to the adjoining circular peripheral portions of the hammer head 22 and the adapter 29, as shown in FIG. 6; to temporarily fix the hammer head 22 and the adapter to each other. That is, the bonding agent 15 is applied in a suitable thickness to an area including a circular portion of the top face 14 of the wall 13 and a circular portion of the side face of the hammer head 22 which projects from and is adjacent to the top face 14. The bonding agent 15, which may be solder, for example, must have a melting point which is higher than that of the elastic material for the connecting member 10. With the bonding agent applied as the above, close covering over the adjoining portions of the hammer head 22 and the adapter 29 as well as the temporary bonding of the these two parts in a predetermined relationship can be obtained.

The temporarily bonded hammer head 22 and adapter 29 are then set in a mold 16 which has an inner configuration corresponding to the outer shape of the connecting member 10 to be formed, as shown in FIG. 7. Heat melted thermo-meltable elastic material such as rubber is poured in the mold 16, and then is cooled to solidify to form the flexible resilient connecting member 10 (FIG. 5). The mold 16 has a longitudinal section as seen in FIG. 7, for example, which is obtained by rotating a curved line about an central axis, and, if desired, may be split into two portions so as to hold the temporarily bonded hammer head 22 and adapter 29 in the mold 16 by clasping the hammer head 22 and the adapter 29 between these two split portions from the side. The temporarily bonded hammer head 22 and adapter 29, after having been placed in the mold 16, may be pushed in the direction shown by the arrow from the striking face 28 of the adapter 29 so as to press a tapered shoulder portion 17 of the hammer head 22 closely against an edge portion 18 of the mold 16 to prevent the leaking out of the poured elastic material. Since the bonding agent 15 which has been applied to the hammer head 22 and the adapter 29 for the temporary bonding thereof is higher in melting point than the elastic material for the connecting member 10, the bonding agent 15 will not melt during the process of forming the connecting member 10, and thus will satisfactorily maintain the predetermined positional relationship between the hammer head 22 and the adapter 29 to prevent them from deviation from the predetermined relational position. The bonding agent 15 also closely covers the circular opening or gap which exists between the adjoining portions of the hammer head 22 and the adapter 29 and leads to the contact area of the head face 25 and the adapter face 27, and accordingly the poured elastic material will not enter the contact area, and the lubricant which has been applied to the contact area will not leak out therefrom.

After the poured elastic material has cooled to solidify, the mold 16 is removed, thus fabrication of the connecting member and accordingly of the hammer head assembly 19 is finished. This hammer head assembly 19 is attached to a handle to form the hammer 21 as shown in FIG. 1. In the state of the hammer 19 at this time, the hammer head 22 and the adapter 29 are solidly fixed to each other by the bonding agent 25. This fixing of the hammer head 22 and the adapter 29, however, will be broken by the first blow of the hammer 21, wherein the adapter 29 is forced to rotate with respect to the hammer head 22 against the bonding action of the bonding agent 15, and thus the bonding agent 15 is broken to allow subsequent easy and smooth rotation of the adapter 29. In addition, a part of the bonding agent 15 will drop off to come in the gap between the hammer head 22 and the adapter 29, and, with repeated hammer blows, mix in the lubricant and also attach to the head face 25 and the adapter face 27 in a thin film state, thus increasing the lubrication effect between the hammer head 22 and the adapter 29.

In order to simplify, speedy and surely the foregoing provisions of the bonding agent 15 over the adjoining portions of the hammer head 22 and the adapter 29, it is preferred to first apply a plating of a material which is substantially the same as the bonding agent such as solder to at least one of the adjoining portions of the hammer head 22 and the adapter 29, for example, to the top face 14 of the sleevelike wall 13.

While the invention has been described in its preferred embodiment, it is to be understood by those skilled in the art that changes and modifications may be made without departing from the spirit and scope of the invention.

What is claimed is:

1. A method of manufacturing a hammer having a hammer head with a head face formed on one end of the hammer, and an adapter with an inner adapter face formed on the inner side of the adapter and a working face formed on the opposite side of the adapter for striking a workpiece, said hammer head and said adapter being secured to each other through a resilient connecting member and with said head face and said adapter inner face being in contact with each other in a predetermined positional relationship therebetween so that upon impact applied on said working face said adapter is rotated about its central axis with respect to said hammer head against the resilient force of said connecting member in a direction from a predetermined position, and upon removal of the impact force said adapter returns automatically to its original position by means of the resilient force of said connecting member, comprising the steps of:
   a. applying lubricant to the contact area of said head face and said adapter face;
   b. positioning said hammer head and said adapter to each other with said head face and said adapter inner face in contact with each other in said predetermined positional relationship;
   c. applying a bonding agent onto adjoining peripheral portions of said hammer head and said adapter to temporarily bond said hammer head and said adapter to each other; and
   d. providing heat melted thermo-meltable elastic material over peripheral portions of said hammer head and said adapter including therebetween said bonding agent which has been applied to said adjoining peripheral portions so as to form said resilient connecting member with said elastic material to permanently secure said hammer head and said adapter to each other.

2. A method according to claim 1 wherein said lubricant is grease.

3. A method according to claim 1 wherein said bonding agent is thermo-meltable and is applied in melted state to said adjoining peripheral portions of the hammer head and the adapter and then is cooled to solidify.

4. A method according to claim 3 wherein said bonding agent is solder.

5. A method according to claim 1 wherein said bonding agent for the temporal bonding of the hammer head and the adapter has a higher melting point than said elastic material for the connecting member.

6. A method according to claim 1 wherein said bonding agent tightly covers the opening which lies between said adjoining portions of the hammer head and the adapter and leads to said contact area of the head face and the adapter face.

7. A method according to claim 1 further including the step of plating at least one of said adjoining peripheral portions of the hammer head and the adapter with a material of the substantially the same kind as said bonding agent, said plating being provided prior to the application of said bonding agent onto said adjoining peripheral portions for the temporary bonding of the hammer head and the adapter to each other.

8. A method according to claim 1 wherein said hammer head and said adapter which have been temporally bonded to each other with said bonding agent are placed in a mold, and said heat melted elastic material is poured into said mold to form the resilient connecting member, said mold being removed after said poured elastic material has solidified.

9. A method according to claim 1 further including the step of applying impact on said striking face of the adapter which has been permanently secured to said hammer head, so as to break the temporary bonding action of said bonding agent.

* * * * *